(12) United States Patent
Høst-Madsen

(10) Patent No.: US 10,767,942 B2
(45) Date of Patent: Sep. 8, 2020

(54) HEAT EXCHANGER

(75) Inventor: Svend Høst-Madsen, Holte (DK)

(73) Assignee: Haldor Topsoe A/S, Lyngby (DK)

( * ) Notice: Subject to any disclaimer, the term of this patent is extended or adjusted under 35 U.S.C. 154(b) by 186 days.

(21) Appl. No.: 13/309,123

(22) Filed: Dec. 1, 2011

(65) Prior Publication Data
US 2012/0193082 A1 Aug. 2, 2012

(30) Foreign Application Priority Data

Jan. 31, 2011 (DK) .................................. 2011 00061

(51) Int. Cl.
F28D 7/06 (2006.01)
F28F 19/00 (2006.01)
F28D 21/00 (2006.01)

(52) U.S. Cl.
CPC .............. *F28F 19/002* (2013.01); *F28D 7/06* (2013.01); *F28D 2021/0075* (2013.01); *F28F 2270/00* (2013.01)

(58) Field of Classification Search
CPC .... F28D 7/06; F28D 7/00; F28F 19/02; F28F 9/02; F28F 2275/125; F28F 2225/04; F22B 37/06
USPC ............. 165/157, 158, 174, 142, 178, 134.1
See application file for complete search history.

(56) References Cited

U.S. PATENT DOCUMENTS

| 1,918,966 | A | | 7/1933 | Harkness |
| 2,502,675 | A | * | 4/1950 | Simpelaar ................ F28D 7/06 165/159 |
| 3,568,764 | A | | 3/1971 | Newman et al. |
| 4,287,944 | A | * | 9/1981 | Becker .......................... 165/158 |
| 4,401,153 | A | * | 8/1983 | Marsch et al. ............. 165/134.1 |
| 4,431,049 | A | * | 2/1984 | Zamma et al. ................ 165/142 |
| 5,452,656 | A | | 9/1995 | Becher et al. |
| 5,775,269 | A | * | 7/1998 | Lawrence ............... F22B 37/08 122/511 |
| 2001/0040024 | A1 | * | 11/2001 | Blanda et al. ............. 165/134.1 |
| 2007/0125317 | A1 | | 6/2007 | Jekerle et al. |

FOREIGN PATENT DOCUMENTS

| DE | 10 2007 031 419 A1 | | 1/2008 | |
| EP | 0 860 673 A2 | | 8/1998 | |
| EP | 0860673 A2 | * | 8/1998 | ............. C01B 3/025 |
| EP | 1 724 544 A1 | | 11/2006 | |
| GB | 380548 A | * | 9/1932 | ............. F22B 21/22 |
| GB | 380548 A | | 9/1932 | |
| GB | 2 089 951 A | | 6/1982 | |

\* cited by examiner

*Primary Examiner* — Travis C Ruby
*Assistant Examiner* — Harry E Arant
(74) *Attorney, Agent, or Firm* — Blank Rome LLP

(57) ABSTRACT

A u-tube heat exchanger has inlet tubes arranged in a pressure neutral inlet tube plate, a heating medium flows via the inlet tubes into u-tubes arranged in a tube sheet where the medium splits in two and flows from both ends of the u-tubes into a heating medium outlet chamber and exits the heat exchanger via an outlet nozzle.

9 Claims, 2 Drawing Sheets

HEAT EXCHANGER

FIELD OF THE INVENTION

The present invention relates to heat exchange in a u-tube heat exchanger designed to operate in critical process conditions such as high temperatures, large temperature differences, high pressure differences and aggressive mediums. More particularly, the invention relates to a u-tube waste heat boiler and more particularly to a synthesis gas waste heat boiler with water or steam as cooling medium.

In the following the present invention will be explained in relation to a waste heat boiler with synthesis gas as the heating medium and water or steam as the cooling medium. It is to be understood that the heat exchanger according to the present invention also applies to waste heat boilers for other heating and cooling mediums or even to other areas of heat exchanging with challenging operating conditions where due care is to be taken against material damage without unacceptable high pressure losses in the heat exchanger.

Industrial production of ammonia is based on the ammonia synthesis process by which hydrogen and nitrogen are reacted to ammonia in an exothermic process. Ammonia synthesis is performed in a reactor at high pressure and elevated temperature, when nitrogen and hydrogen is flowing through a bed with an appropriate catalyst. Such a reactor is called an ammonia converter. The heat produced by the exothermic process in the converter is often recovered by steam production in a synthesis gas waste heat boiler. The synthesis gas waste heat boiler is a heat exchanger in which the hot gas from the ammonia converter is cooled by indirect heat transfer to boiling water.

The synthesis gas waste heat boiler is operating at challenging conditions which in many ways require a special design of the boiler. The most severe conditions are related to inlet gas tube to tube sheet joins.

In the heat exchanger according to the invention, there are no inlet gas tube to tube sheet joints. Further, the tube sheet as well as the tube sheet joints is only exposed to the heating medium after it has been cooled. Therefore, most of the causes for boiler failure are avoided by the design according to the present invention.

BACKGROUND OF THE INVENTION

A heat exchanger such as a synthesis gas waste heat boiler is subject to a number of special conditions, which are difficult to account for by combination in one design.

These conditions are related to the pressure, temperature, nitriding, hydrogen attack and stress corrosion.

The ammonia synthesis gas will typically be at a pressure of 120-220 bar. The boiling water will typically be at low (5-15 bar), medium (30-50 bar) or high pressure (90-130 bar). Separation walls between synthesis gas and boiling water must be designed for the highest pressure difference of the two fluids. In shell and tube heat exchangers this will normally result in a very thick tube sheets usually with a thickness of 300-450 mm.

The ammonia synthesis gas can be between 380° C. and 500° C. at the inlet to the boiler and between 200° C. and 380° C. at the outlet. The boiling water can be between 150° C. and 330° C., depending on the steam pressure.

Synthesis gas waste heat boilers are often designed as u-tube exchangers with a very thick tube sheet. The thick tube sheet will obtain a metal temperature which is close to the gas temperature of the sheet penetrating tubes. In case of u-tubes, this will in known art imply that the inlet tube area will be hot where as the outlet tube area will be cold. High thermal induced stresses are therefore a risk, if the temperature difference between inlet and outlet gas is too high. In case of low and medium pressure steam production is it desirable if a temperature difference of 200° C. to 300° C. could be acceptable. It has however in know art shown difficult or impossible to design a u-tube waste heat boiler for such a big temperature difference.

Nitriding is a materials attack caused by the ammonia content of the synthesis gas. The severity of nitriding depends on the metal alloy and the metal temperature. Low alloy steels are attacked unacceptably at 380° C. Stainless steel can be used to 450° C. or higher and Iconell will not be severely attacked even at 500° C. The inlet-tube area of the tube sheet in a U-tube boiler will often be hotter than 420° C. The materials, in contact with the synthesis gas must therefore be high alloy. A surface protection by cladding or lining will be required on the gas side of the tube sheet and through the inlet-hole surface.

Hydrogen attack will cause embrittlement in materials when exposed to hydrogen containing gasses. The important parameters are the hydrogen partial pressure, the temperature and the alloying elements of the steel. 2% Cr and 1% Mo steel alloy will typically be required by industrial synthesis gas composition, pressure and temperature.

Stress corrosion is a risk for the materials in connection with the water. This kind of corrosion is however not critical by ferritic materials, whereas austenitic materials are sensitive to this kind of attack. The typical synthesis gas waste heat boiler is a U-tube heat exchanger with synthesis gas on the tube side and water/steam on the shell side. The tube sheet is very thick. The inlet side of the tube sheet is protected by Inconell cladding. If the tubes are welded to the gas side of the tube sheet, the tubes must be lined on the inner surface with Inconell all the way through the tube sheet. If the tubes are welded to the waterside of the tube sheet, the inlet holes of the tube sheet must be protected by an Inconell lining.

Synthesis gas waste heat boilers often fail due to cracks caused by one or a combination of the described mechanical and/or corrosion phenomena. The most severe conditions among these are concentrated around the inlet tube holes. That is due to the high temperature, the temperature difference between inlet and outlet tubes, stress corrosion, hydrogen build up between materials of different composition, nitriding and hydrogen attack. Another aspect of the Synthesis Gas boiler is the pressure drop of the synthesis gas through the exchanger, which have to be kept low due to considerations of power/energy consumption of the synthesis gas compressor.

In U.S. Pat. No. 3,568,764 a u-tube heat exchanger is disclosed where a baffle is provided adjacent to the outlet side of the tube sheet of the multiple tube pass heat exchanger. A portion of the cold input fluid is passed between the baffle and the tube sheet, rather than through the tubes, so that the tube sheet is maintained at a substantially uniform and cold temperature. Ferrules pass the heated outlet gas portions from the tubes to the outlet chamber of the channel. The heat exchange efficiency is however lowered due to the portion of input fluid which by-passes the heat exchange tubes. The heating fluid is on the shell side of the exchanger, which is contrary to present invention where the cooling fluid is on shell side.

In EP 0860673 a solution to the above problems is disclosed by a fire tube heat exchanger with a plurality of heat exchanging tubes, wherein the heat exchanging tubes are in form of a double tube with an outer tube closed at one end and an open ended inner tube spaced apart from the outer tube, adapted to exchange heat between a hot gas on tube side of the outer tube and a fluid on shell side of the tube. Though solving the above mentioned problems, this solution has however a considerable pressure drop on tube side compared to an U-tube exchanger, which renders the solution more expensive due to expenses in relation to increased heat exchange surface for a given pressure drop.

SUMMARY OF THE INVENTION

An object of this invention is to avoid the drawbacks of the known art heat exchangers in particular known waste heat boilers by providing a u-tube heat exchanger with a fair heat transfer, material deterioration resistance and low pressure drop.

This is achieved by a heat exchanger according to the following features of the present invention.

Features of the Invention

1. A u-tube heat exchanger for heat exchanging a heating medium with a cooling medium, the heat exchanger comprising
   a cooling medium chamber with an inlet and an outlet
   a heating medium inlet chamber with an inlet
   a heating medium outlet chamber with an outlet
   a tube sheet with a plurality of tube sheet holes, the tube sheet separates the cooling medium chamber on a first side from the heating medium outlet chamber on the second side
   a plurality of heat exchange u-tubes having a first and a second end
   a plurality of inlet tubes having an inlet and an outlet end, each inlet tube corresponds to one of the u-tubes
   an inlet tube plate arranged so that it separates the heating medium inlet chamber from the heating medium outlet chamber, the inlet tube plate has a plurality of inlet tube plate holes
said plurality of heat exchange u-tubes are arranged in the tube sheet with said first and second end connected to the circumference of a tube sheet hole each, the u-tubes extend within the cooling medium chamber in contact with the cooling medium on the shell side of the u-tubes, and said plurality of inlet tubes are arranged in the inlet tube plate with the inlet end connected to the circumference of an inlet tube plate hole each, wherein the outlet end of each of the inlet tubes is arranged partly within the first end of a corresponding heat exchange u-tube, the outside diameter of each inlet tube is smaller than the inside diameter of the corresponding heat exchange u-tubes first end in at least the part of each u-tube wherein the corresponding inlet tube is arranged within, the only fluid connection between the heating medium inlet chamber and the tube sheet and the inside of the u-tubes are via the fluid passage of the inlet tubes, whereby both the first and the second end of the u-tubes as well as the tube sheet are in contact with only the cooled heating medium on the tube side of the u-tubes and the tube sheet.

2. A u-tube heat exchanger according to feature 1, wherein the cooling medium is water or steam, synthesis gas or process gas.

3. A u-tube heat exchanger according to any of the preceding features, wherein the heat exchanger is a waste heat boiler and the cooling medium is water or steam.

4. A u-tube heat exchanger according to any of the preceding features, wherein the heat exchanger is a synthesis gas waste heat boiler and the heating medium is synthesis gas.

5. A u-tube heat exchanger according to any of the preceding features, wherein the cooled heating medium exiting the first end of each of the plurality of u-tubes has a temperature substantially equal to the cooled heating medium exiting the second end of each of the plurality of u-tubes.

6. A u-tube heat exchanger according to any of the preceding features, wherein the temperature difference between the cooled heating medium exiting the first end of each of the plurality of u-tubes and the cooled heating medium exiting the second end of each of the plurality of u-tubes is in the range of 0° C.-50° C., preferably in the range of 0° C.-20° C.

7. A u-tube heat exchanger according to any of the preceding features, wherein at least the part of the plurality of inlet tubes arranged within a corresponding u-tube is thermally insulated.

8. A u-tube heat exchanger according to any of the preceding features, wherein there is an annulus between the part of each of the inlet tubes arranged within the first end of a corresponding heat exchange u-tube and the corresponding heat exchange u-tubes first end.

9. A u-tube heat exchanger according to any of the preceding features, wherein the plurality of inlet tubes are not in contact with the plurality of u-tubes.

10. A u-tube heat exchanger according to any of the preceding features wherein the diameter of the second end of each of the u-tubes is smaller than the diameter of the first end of said u-tube.

11. A process for heat exchanging a heating medium with a cooling medium in a u-tube heat exchanger according to feature 1, the process comprising the steps of
   a) providing a flow of the cooling medium via the cooling medium inlet into the cooling medium chamber, where the cooling medium contacts the shell side of the u-tubes, and out of the cooling medium chamber via the cooling medium outlet,
   b) providing a flow of the heating medium to the heating medium chamber via the heating medium inlet,
   c) providing the flow of the heating medium further through the holes of the inlet tube plate into the inlet tubes inlet ends, further through the inlet tubes and out of the inlet tubes outlet ends and into each of the corresponding u-tubes in a distance from said u-tubes first end,
   d) splitting the heating medium flow in each of the u-tubes in a first part flow which flows through a first part of each u-tube in the annulus between the inlet tube and the u-tube before the first part flow exits each u-tube via the first end and a second part flow which flows through a second part of each u-tube and exits each u-tube via the second end, both the first and the second part flow is in indirect heat-exchange with the cooling medium via the u-tubes walls and is cooled by the cooling medium while it flows through the u-tubes
   e) collecting all the cooled heating medium flows in the heating medium outlet chamber where the cooled heating medium is in contact with the tube sheets second side and further providing a flow of the cooled heating medium out of the heating medium outlet chamber via the heating medium outlet.

12. A process for heat exchanging a heating medium with a cooling medium according to feature 11, wherein the cooling medium is water or steam.

13. A process for heat exchanging a heating medium with a cooling medium according to feature 11 or 12, wherein the cooling medium inlet temperature is in the range of 100° C.-350° C., preferably in the range of 250° C.-325° C., the cooling medium outlet temperature in the range of 100° C.-350° C., preferably in the range of 250° C.-325° C., the heating medium inlet temperature is in the range of 300° C.-500° C., preferably in the range of 390° C.-450° C., and the heating medium outlet temperature in the range of 120° C.-390° C., preferably in the range of 300° C.-370° C.

14. A process for heat exchanging a heating medium with a cooling medium according to any of the features 11-13, wherein the temperature difference between each of the first part cooled heating medium flows and the second part cooled heating medium flows is in the range of 0° C.-50° C., preferably in the range of 0° C.-20° C. when exiting the first and the second end of each of the u-tubes into the heating medium outlet chamber.

15. Use of a heat exchanger according to any of the features 1-10 for heat exchanging water or steam with synthesis gas.

BRIEF DESCRIPTION OF THE DRAWINGS

The present invention will be discussed in more detail with reference to the specific embodiments in the drawings which relate to a waste heat boiler heat exchanger.

REFERENCE NUMBERS

Figure 1:
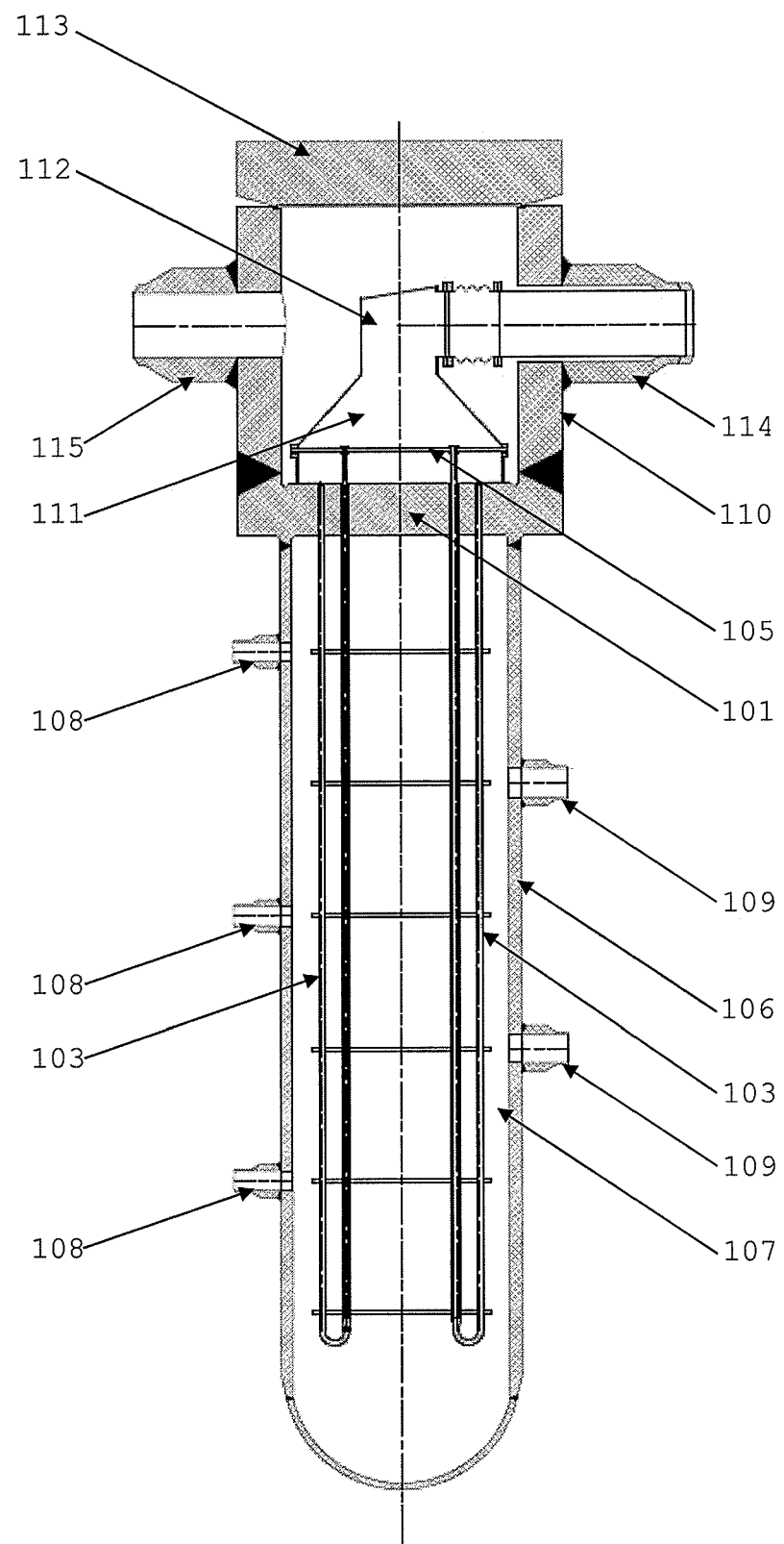
FIG. 1 is a cross section view of an embodiment of a waste heat boiler according to the invention.

101) Tube sheet
102) Tube sheet holes
103) Heat exchange u-tubes
104) Inlet tubes
105) Inlet tube plate
106) cooling medium side pressure shell
107) cooling medium chamber
108) cooling medium inlet nozzle
109) cooling medium outlet nozzle
110) Heating medium side pressure shell
111) Heating medium chamber
112) Heating medium inlet chamber
113) Heating medium outlet chamber
114) Heating medium inlet nozzle
115) Heating medium outlet nozzle
116) Inlet tube insulation

DETAILED DESCRIPTION OF THE INVENTION

The tube sheet (101) is on one side connected to the cooling medium side pressure shell (106) (e.g. water/steam) and on the other side connected to the heating medium side pressure shell (110) and forms the separation between the cooling medium chamber (107) and the heating medium chamber (111) (e.g. synthesis gas). The tube sheet is perforated with a number of tube sheet holes (102). The heat exchange u-tubes (103) are welded to the tube sheet (101) at both ends of the u-tubes in the tube sheet holes (102). The heat exchange u-tubes (103) extend into the cooling medium chamber (107). An inlet tube plate (105) is placed inside the heating medium chamber (111). The inlet tube plate (105) is perforated with holes corresponding to the holes in the tube sheet (101). Inlet tubes (104) with an outer diameter smaller than the inner diameter of the heat exchange u-tubes (103) are fixed to the holes of the inlet tube plate (105) and extend into the inside of the heat exchange u-tubes (103). The inlet tube plate (105) is connected to the heating medium nozzle (114) by means of plates and shells forming a gas tight heating medium inlet chamber (112). The inlet tubes (104) are covered with an inlet tube insulation layer (116).

A cooling media as e.g. boiling feed water from a steam drum is flowing into the cooling medium chamber (107) through the cooling medium inlet nozzle (108). The heat exchange u-tubes (103) are supplying heat for boiling in the cooling medium chamber (107). A mixture of water and steam is leaving the cooling medium chamber (107) through the cooling medium outlet nozzles (109). A heating medium as e.g. hot synthesis gas from an ammonia converter enters into the heating medium inlet chamber (111) through the heating medium inlet nozzle (114). The synthesis gas then flows through the holes of the inlet tube plate (105), through the inlet tubes (104) into the heat exchange u-tubes (103). In each heat exchange u-tube a first part of the synthesis gas flow is changing flow direction, returning in the u-tubes in the annulus, outside of the inlet tubes (104) and inside the heat exchange u-tubes (103), back to the heating medium outlet chamber (113). A second part of the synthesis gas flow in each heat exchange u-tube flows further on to the u-bend of the u-tube and flows to the heating medium outlet chamber (113). The synthesis gas then leaves the heat exchanger through the heating medium outlet nozzle (115).

When the synthesis gas is flowing in the annulus between the inlet tube (104) and the heat exchange u-tube (103) it is cooled while it is transferring its heat by indirect heat transfer to the boiling water. Heat transfer between the inlet gas, flowing inside the inlet tubes (104) and the gas flowing in the annulus is avoided by means of the inlet tube insulation layer (116).

Figure 2:
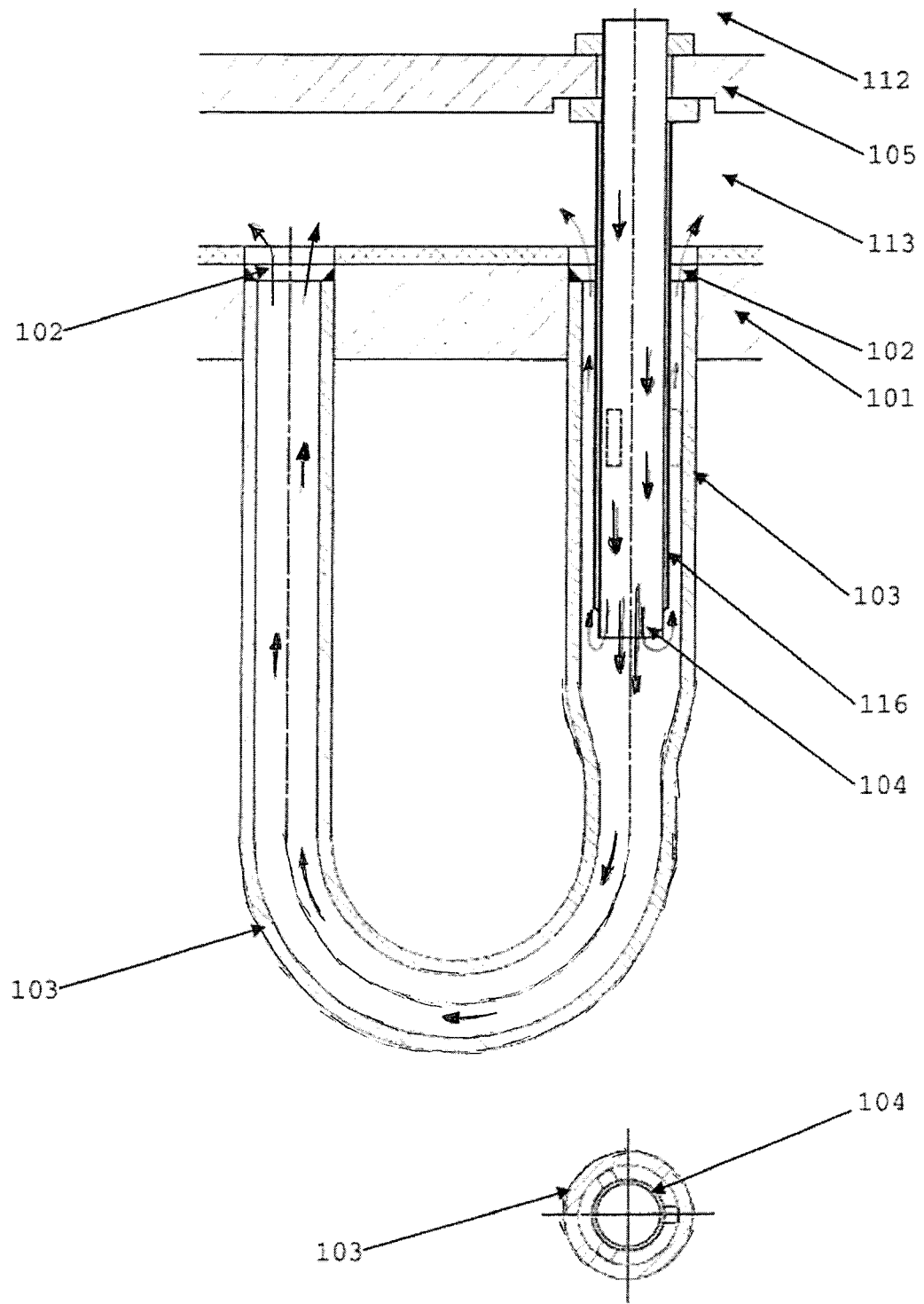
FIG. 2 is a cross section view of a u-tube detail in an embodiment of a waste heat boiler according to the invention.

The characteristic benefit of the heat exchanger according to the invention is that the thick tube sheet (101) will only come in contact with the cooled outlet synthesis gas. The problems experienced with synthesis gas waste heat boilers as described above related to the hot inlet gas and the temperature difference between tubes in the thick tube sheet is thereby minimized. The inlet tube plate (105) of the invention is thin because it is a non pressure part and it can be made of austenitic high alloy steel because it is not in contact with the water. The heat exchanger according to the invention has a reduced pressure drop as compared to blind tube heat exchangers as the gas stream is split in two when leaving the inlet tubes. The pressure drops and heat transfer coefficients of the first and the second gas streams flowing through a first and a second part and outlet of the u-tubes can be equilibrated in such a way that the synthesis gas temperature will be similar at both the u-tubes outlet ends. This may in one embodiment be done by reducing the diameter of the second end of the u-tubes as seen in FIG. 2.

What is claimed is:
1. A u-tube heat exchanger, comprising:
a cooling chamber with an inlet and an outlet;
an inlet chamber with an inlet;
an outlet chamber with an outlet, the inlet chamber arranged within the outlet chamber;

a tube sheet with a plurality of circularly arranged tube sheet holes, the tube sheet separates the cooling chamber on a first side from the outlet chamber on the second side;

said u-tube heat exchanger having a central, longitudinal axis, a plurality of heat exchange u-tubes circumferentially arranged around said central, longitudinal axis, each of said u-tubes having a feed end and a discharge end, each of said plurality of heat exchange u-tubes comprising, in sequence:
a first tube extending from said feed end to a downstream end,
a u-bend, and
a second tube extending from said u-bend and terminating at said discharge end, each u-bend being entirely radially spaced from said central longitudinal axis of said heat exchanger, such that the first tube, the u-bend and the second tube of each u-tube are all radially offset on one common side of said central longitudinal axis,
a tapered tubular wall section within said first tube which tapers towards and is closer to said u-bend than said feed end, wherein an inner diameter of said feed end and an inner diameter of an upstream end of said tapered tubular wall section are the same;

a plurality of inlet tubes each having open inlet and discharge ends, each inlet tube respectively cooperating with one of said circularly arranged holes of the tube sheet and each discharge end extending into and terminating within said first tube upstream of said tapered tubular wall section, each of said plurality of inlet tubes including an outer surface layer of insulation, said outer surface layer of insulation being spaced from an inner wall surface of said first tube to define an annular flow channel, wherein said outer surface layer of insulation terminates prior to said discharge end of said inlet tube to provide a wider portion of said annular flow channel at said discharge end of said inlet tube, said discharge end cooperating with said tapered tubular wall to split and force a portion of synthesis gas emanating from said inlet tube into said wider portion of said annular flow channel, and flow in a direction opposite to said emanating synthesis gas, through said tube sheet into said outlet chamber, and a second portion of said synthesis gas that continues to flow towards the u-bend of the u-tube, through said second tube and through said tube sheet into said outlet chamber, such that synthesis gas flowing in said opposite direction through said annular flow channel and exiting said annular flow channel through said tube sheet and into said outlet chamber, and synthesis gas flowing forward through said second tube and exiting said discharge end through said tube sheet and into said outlet chamber, will be cooled by indirect heat transfer in said cooling chamber, such that the tube sheet will only come in direct contact with cooled synthesis gas passing through said annular flow channel of said inlet tube and cooled synthesis gas passing through said outlet chamber, and wherein the pressure drops and heat transfer coefficients of the synthesis gas flowing through the first and second tubes and exiting the u-tubes are equalized by reducing the diameter of the second tubes relative to the diameter of the feed end of the first tubes, such that cooled synthesis gas exiting the annular flow channel at the feed end of each of the first tubes of the plurality of u-tubes and passing through the tube sheet has a temperature equal to the cooled synthesis gas exiting the discharge end of the second tubes of the plurality of u-tubes and passing through the tube sheet, thereby avoiding a temperature gradient across the tube sheet;

an inlet tube plate arranged so that it separates the inlet chamber from the outlet chamber, wherein the inlet tube plate has a plurality of circularly arranged inlet tube plate holes, each of which is connected to said open inlet end of each of said inlet tubes;

said plurality of heat exchange u-tubes extend within the cooling medium chamber in contact with the cooling medium on a shell side of the u-tubes, wherein the only fluid connection between the inlet chamber and the tube sheet and the inside of the u-tubes is via a fluid passage of the inlet tubes, whereby both ends of the u-tubes as well as the tube sheet are in contact with only the cooled synthesis gas on the tube side of the u-tubes and the tube sheet, and wherein the insulation layer prevents heat transfer between synthesis gas flowing inside the inlet tubes and in the annular channel.

2. The u-tube heat exchanger according to claim 1, wherein the cooling medium is water or steam, synthesis gas or process gas.

3. The u-tube heat exchanger according to claim 1, wherein the heat exchanger is a synthesis gas waste heat boiler.

4. The u-tube heat exchanger according to claim 1, wherein the temperature difference between the cooled synthesis gas exiting the first end of each of the plurality u-tubes and the cooled synthesis gas exiting the second end of each of the plurality of u-tubes is in the range of 0° C.-50° C.

5. The u-tube heat exchanger according to claim 1, wherein the plurality of inlet tubes are not in contact with the plurality of u-tubes.

6. A process for cooling synthesis gas via indirect heat exchange with a cooling medium in the u-tube heat exchanger according to claim 1, the process comprising the steps of:
a) providing a flow of the cooling medium via the cooling chamber inlet into the cooling chamber, where the cooling medium contacts the shell side of the u-tubes, and out of the cooling chamber via the cooling chamber outlet,
b) providing a flow of the synthesis gas into the inlet chamber via the inlet of the inlet chamber,
c) providing the flow of the synthesis gas further through the holes of the tube sheet into the inlet ends of the inlet tubes, further through the inlet tubes and out of the outlet ends of inlet tubes and into each of the corresponding u-tubes,
d) splitting the synthesis gas flow in each of the u-tubes into a first part flow which flows through the first tube of each u-tube in the annular flow channel between the inlet tube and the u-tube before the first part flow exits each u-tube via the feed end, and a second part flow which flows through the second tube of each u-tube and exits each u-tube via the discharge end, both the first and the second tube flow being in indirect heat-exchange with the cooling medium via the u-tubes walls, the synthesis gas being cooled by the cooling medium while it flows through the u-tubes, and
e) collecting all of the cooled synthesis gas flows in the outlet chamber, where the cooled synthesis gas is in contact with the tube sheet, and further providing a flow of the cooled synthesis gas out of the outlet chamber via the outlet of the outlet chamber.

7. A process for cooling synthesis gas via indirect heat exchange with a cooling medium according to claim 6, wherein the cooling medium is water or steam.

8. A process for cooling synthesis gas via indirect heat exchange with a cooling medium according to claim 6, wherein the cooling medium inlet temperature is in the range of 100° C.-350° C., the cooling medium outlet temperature in the range of 100° C.-350° C., the synthesis gas inlet temperature is in the range of 300° C.-500° C., and the synthesis gas outlet temperature in the range of 120° C.-390° C.

9. A process cooling synthesis gas via indirect heat exchange with a cooling medium according to claim 6, wherein the temperature difference between the first and second portions of each of the synthesis gas is in the range of 0° C.-50° C., when exiting the first and the second tubes of each of the u-tubes into the outlet chamber.

\* \* \* \* \*